US010823332B2

(12) United States Patent
Lee (10) Patent No.: US 10,823,332 B2
(45) Date of Patent: Nov. 3, 2020

(54) HIGH PRESSURE TANK HAVING REINFORCED BOSS PART

(71) Applicants: HYUNDAI MOTOR COMPANY, Seoul (KR); KIA MOTORS CORPORATION, Seoul (KR)

(72) Inventor: Dong Sun Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 302 days.

(21) Appl. No.: 15/660,242

(22) Filed: Jul. 26, 2017

(65) Prior Publication Data

US 2018/0172208 A1   Jun. 21, 2018

(30) Foreign Application Priority Data

Dec. 20, 2016   (KR) .................. 10-2016-0174274

(51) Int. Cl.
*F17C 1/06* (2006.01)
*F17C 13/00* (2006.01)

(52) U.S. Cl.
CPC ............... *F17C 1/06* (2013.01); *F17C 13/00* (2013.01); *F17C 2201/0109* (2013.01); *F17C 2203/011* (2013.01); *F17C 2203/0604* (2013.01); *F17C 2203/067* (2013.01); *F17C 2203/0646* (2013.01); *F17C 2203/0663* (2013.01); *F17C 2205/0305* (2013.01); *F17C 2221/012* (2013.01); *F17C 2223/0123* (2013.01); *F17C 2223/036* (2013.01); *F17C 2260/011* (2013.01); *F17C 2260/012* (2013.01); *F17C 2260/042* (2013.01); *F17C 2270/0102* (2013.01); *F17C 2270/0168* (2013.01); *F17C 2270/0171* (2013.01); *F17C 2270/0173* (2013.01); *F17C 2270/0176* (2013.01); *F17C 2270/0178* (2013.01); *F17C 2270/0184* (2013.01); *Y02E 60/321* (2013.01)

(58) Field of Classification Search
CPC .............................................. F17C 2205/0305
See application file for complete search history.

(56) References Cited

U.S. PATENT DOCUMENTS 3,840,139 A * 10/1974 Harmon ................... F16J 12/00
                                                                 220/590
5,253,778 A * 10/1993 Sirosh ....................... F17C 1/16
                                                                 220/495.05
5,429,845 A *  7/1995 Newhouse ................ F17C 1/16
                                                                 138/30

(Continued)

FOREIGN PATENT DOCUMENTS

KR    10-2014-0062169 A    5/2014

*Primary Examiner* — Fenn C Mathew
*Assistant Examiner* — Jennifer Castriotta
(74) *Attorney, Agent, or Firm* — Morgan, Lewis & Bockius LLP (57) ABSTRACT

A high pressure tank having a reinforced boss part includes: a liner; a dome formed at each end of the liner; and a boss formed at one end of the dome. The boss includes: a head including a flow path through which fuel flows into and out of the high pressure tank; and a shoulder extending in a radial direction from the head and surrounding the head. The shoulder has one or more hollow portions formed therein.

17 Claims, 5 Drawing Sheets

(56) References Cited

U.S. PATENT DOCUMENTS

| | | | | |
|---|---|---|---|---|
| 5,476,189 | A * | 12/1995 | Duvall | F17C 1/16 220/588 |
| 5,518,141 | A * | 5/1996 | Newhouse | F17C 1/16 220/586 |
| 5,979,692 | A * | 11/1999 | West | F17C 1/16 220/586 |
| 6,227,402 | B1 * | 5/2001 | Shimojima | F17C 1/16 220/581 |
| 7,648,042 | B2 * | 1/2010 | Lee | F17C 13/06 220/582 |
| 8,051,977 | B2 | 11/2011 | Fujita et al. | |
| 8,733,581 | B1 * | 5/2014 | Olson | F17C 1/06 220/586 |
| 8,757,422 | B2 | 6/2014 | Nishizaki et al. | |
| 2011/0210127 | A1 | 9/2011 | Strack et al. | |
| 2011/0303681 | A1 * | 12/2011 | Newhouse | F17C 1/06 220/581 |
| 2012/0037641 | A1 * | 2/2012 | Bruce | F17C 13/002 220/589 |
| 2014/0295323 | A1 * | 10/2014 | Schulze | H01M 8/04201 429/515 |
| 2016/0061381 | A1 | 3/2016 | Kotliar | |
| 2017/0284601 | A1 * | 10/2017 | Kusaba | F17C 1/04 |

* cited by examiner

HIGH PRESSURE TANK HAVING REINFORCED BOSS PART

CROSS-REFERENCE TO RELATED APPLICATION

This application claims under 35 U.S.C. § 119(a) the benefit of priority to Korean Patent Application No. 10-2016-0174274 filed on Dec. 20, 2016, the entire content of which is incorporated herein by reference.

TECHNICAL FIELD

The present disclosure relates to a high-pressure tank having a reinforced boss part, which can be installed in a fuel supply system or specifically hydrogen supply system in a vehicle having a fuel cell system mounted therein. More particularly, the present disclosure relates to a boss reinforcing structure for a high pressure tank, which is capable of increasing section modulus of a boss which is formed at a helical layer of the high pressure tank.

BACKGROUND

In general, a fuel cell system includes: a fuel cell stack for generating electrical energy; a fuel supply system for supplying fuel (hydrogen) to the fuel cell stack; an air supply system for supplying oxygen of the air to the fuel cell stack, the oxygen serving as an oxidizer required for an electrochemical reaction; and a heat and water management system for controlling an operation temperature of the fuel cell stack.

The fuel supply system, that is, a hydrogen supply system, includes a hydrogen tank which stores hydrogen compressed at a high pressure of about 700 bar. The stored compressed hydrogen is discharged to a high pressure line according to an on/off of a high pressure regulator mounted at the inlet of the hydrogen tank, decompressed while passing through a starting valve and a hydrogen supply valve, and then supplied to the fuel cell stack.

Since the high-pressure gas is used as fuel (hydrogen), a gas storage tank is required in order to store or discharge the gas as needed. In particular, since the gas has low storage density in the tank, it is efficient to store the gas at the high pressure. In this case, the gas may be exposed to a risk of explosion caused by the high pressure. In particular, since an alternative fuel gas vehicle has a limited mounting space for a storage tank, the storage tank is required to ensure stability while maintaining a storage pressure at the high pressure.

Therefore, a composite tank which is an example of the fuel gas storage tank has a surface reinforced with a fiber-reinforced composite material having high specific strength and stiffness in order to endure the high internal pressure of hydrogen gas. In addition, the composite tank includes a liner inserted therein, the liner maintaining the airtightness of the composite tank. Specifically, two hemispherical liners may be bonded to both ends, thereby constituting one storage tank.

The storage tank for gas or particularly hydrogen can be classified based on the material of a liner inserted therein. Specifically, a tank into which a liner made of a metallic material such as aluminum is inserted may be referred to as type 3, and a tank into which a liner made of high-density polymer is inserted may be referred to as type 4. The type-3 tank is relatively stable, but has a high price and exhibits low fatigue resistance. On the other hand, the type-4 tank has a relatively low price and exhibits high fatigue resistance but has a stability problem such as hydrogen leak or low anti-permeability.

In particular, the type-4 tank must use a large amount of carbon fiber in order to reinforce a weak portion of a dome-shaped end part, that is, a dome part, and a boss including a metallic nozzle may be located in the dome part. Thus, the structure design of a metallic boss may have an influence on the stability of the entire dome part. Furthermore, the structure design of the metallic boss is directly related to the whole weight of a high pressure tank and the efficiency of a fuel cell system having the high pressure tank mounted therein.

The metallic boss of the high pressure tank according to the related art requires a relatively large thickness or length in order to increase the durability thereof. In this case, since the weight of the high pressure tank is increased and the hydrogen weight efficiency is decreased, the whole efficiency of the fuel cell system is inevitably reduced.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the related art and to provide a structure which includes hollow portions formed in a metal boss in order to increase section modulus of the metal boss while reducing stress, thereby reducing the weight of the boss and increasing the durability of a high pressure tank.

According to an exemplary embodiment of the present disclosure, a high pressure tank has a reinforced boss part, including a liner and a dome formed at each end of the liner, in which the high pressure tank includes a boss formed at one end of the dome. The boss includes: a head including a flow path through which fuel flows into and out of the high pressure tank; and a shoulder extending in a radial direction from the head and surrounding the head. The shoulder has one or more hollow portions formed therein.

Each of the one or more hollow portions may have a ring shape in the shoulder, while have a concentric circular shape from the head of the boss, and a width of each of the one or more hollow portions increases toward the head.

The one or more hollow portions may have a plate shape in the shoulder, and arranged in a radial direction from a center of the head.

According to another exemplary embodiment of the present disclosure, a high pressure tank having a reinforced boss part includes: a liner; a dome formed at each end of the liner; a boss formed at one end of the dome. The boss includes: a head including a flow path through which fuel is introduced into and out of the high pressure tank; and a shoulder extending in a radial direction from the head and surrounding the head. The shoulder has one or more semi-hollow portions formed at an outer circumferential surface of the shoulder.

Each of the one or more hollow portions may have a ring shape at the outer circumferential surface of the shoulder, while having a concentric circular shape from the head of the boss.

The one or more hollow portions may be arranged in a radial direction from a center of the head.

The hollow portions may be arranged in a waffle pattern at the outer circumferential surface of the shoulder.

According to still another exemplary embodiment of the present disclosure, a high pressure tank having a reinforced boss part includes: a liner; a dome formed at each end of the liner; a boss formed at one end of the dome. The boss includes: a head including a flow path through which fuel is introduced into and out of the high pressure tank; and a shoulder extending in a radial direction from the head and surrounding the head. The shoulder has one or more hollow portions formed therein and one or more semi-hollow portions formed at an outer circumferential surface of the shoulder.

Each of the one or more semi-hollow portions at the outer circumferential surface of the shoulder may be located at an upper portion of a wall between two adjacent hollow portions among the one or more hollow portions formed in the shoulder.

Each of the one or more hollow portions and the one or more semi-hollow portions may be arranged at a constant interval.

A composite material may be wound around the shoulder of the boss.

The head may include: a plurality of liners having different diameters; and a tapered inclined surface connecting the liners having different diameters. A composite material may be wound around the head to a level at which the tapered inclined surface meets a liner having the largest diameter between the plurality of liners.

Through the above-described aspects, the present disclosure has the following effects.

The amount of material used for the boss for the high pressure tank can be reduced. Therefore, the cost and weight of the high pressure tank can be reduced, while the hydrogen weight efficiency is increased.

The section modulus of the boss in the high pressure tank can be increased by the hollow portions. The increased section modulus can increase the resistance of the boss to bending. Therefore, the structural strength and durability of the boss can be increased. Furthermore, the cyclic fatigue durability of the boss can also be extended.

Since the stress of the boss can be reduced by the composite material wound on the boss, it is possible to prevent damage to a weak portion in the boss due to the stress when the composite material is wound. Furthermore, since the amount of wound composite material can be reduced, the weight of the boss can be reduced and the weight of the high pressure tank depending on the reduced amount of composite material can be reduced.

Other aspects and embodiments are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The terms "~er", "~unit" and "~module" described in the specification may indicate a unit for processing one or more functions or operations, and the unit can be implemented by hardware, software, or a combination of hardware and software.

A fuel cell system mounted in a vehicle generally includes a fuel cell stack for generating electrical energy, a fuel supply device for supplying a fuel (hydrogen) to the fuel cell stack, an air supply device for supplying oxygen of the air to the fuel cell stack, the oxygen serving as an oxidizer required for an electrochemical reaction, and a cooling system for removing reaction heat of the fuel cell stack to the outside of the system and controlling an operation temperature of the fuel cell stack.

A fuel supply system of the fuel cell system may include a high pressure tank containing fuel therein and serving as a fuel storage tank. The high pressure tank may contain hydrogen as a fuel. For example, hydrogen gas compressed at a high pressure of about 700 bar may be stored in the high pressure tank.

Thus, the fuel or hydrogen gas contained in the high pressure tank may be continuously maintained in a high-pressure state, while pressurizing the high pressure tank. In particular, when a leak or fracture occurs at one spot of the high pressure tank, the internal high pressure may be concentrated on the spot, thereby damaging the high pressure tank or causing an explosion. Thus, the durability and stability of the high pressure tank is an important factor for a fuel cell system and a vehicle in which the fuel cell system can be mounted.

The high-pressure tank includes a liner made of plastics and a boss part, which is formed at one end of the liner and includes a nozzle for injecting or discharging fuel. According to the recent trend, a type-4 high pressure tank has been frequently used. The type-4 high pressure tank may be formed by winding a carbon fiber composite material on the outside of a structure in which the liner and the boss part are coupled to each other.

Such a type-4 high pressure tank may include a liner which constitutes the main body of the high pressure tank and a hemispherical dome which is formed at either end of the liner and constitutes the high pressure tank with the liner. The hemispherical dome may have a portion relatively weak to high-pressure hydrogen. In order to reinforce such a weak portion, a large amount of carbon fiber composite material needs to be wound on the outside of the dome. A winding thickness may have an influence on the durability of the dome or specifically the weak portion of the dome and the whole weight of the high pressure tank, and determine the whole efficiency of the fuel cell system.

Therefore, the present disclosure provides a high pressure tank including a boss structure which has an empty space formed in a boss at one end of a dome or a groove formed outside the boss, thereby not only lowering the weight of the boss while increasing the strength and durability thereof, but also reducing the amount of wound carbon fiber composite material. Hereafter, a high pressure tank having a reinforced boss according to an exemplary embodiment of the present disclosure will be described in detail with reference to the accompanying drawings. In an exemplary embodiment, the high pressure tank is divided into 'liner' and 'dome'. Specifically, 'liner' may indicate a cylindrical part of the high pressure tank, and 'dome' may indicate a hemispherical part which is formed at either end of the liner and constitutes the high pressure tank with the liner. Further, 'hollow portion' may indicate 'empty space' which can be formed in the boss or specifically a shoulder, and 'semi-hollow portion' may indicate 'groove' which can be formed along the outer circumferential surface of the boss, or specifically the outer circumferential surface of the shoulder of the boss. In this specification, the terms of a singular form may include plural forms unless referred to the contrary.

Figure 1:
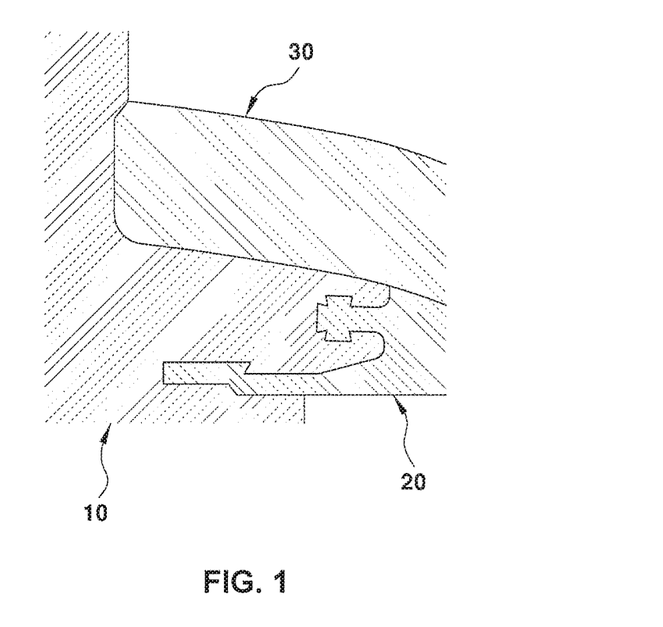
FIGS. 1 and 2 are diagrams illustrating a structure of a dome having a boss part, a composite material, and a liner, according to the related art.
Figure 2:
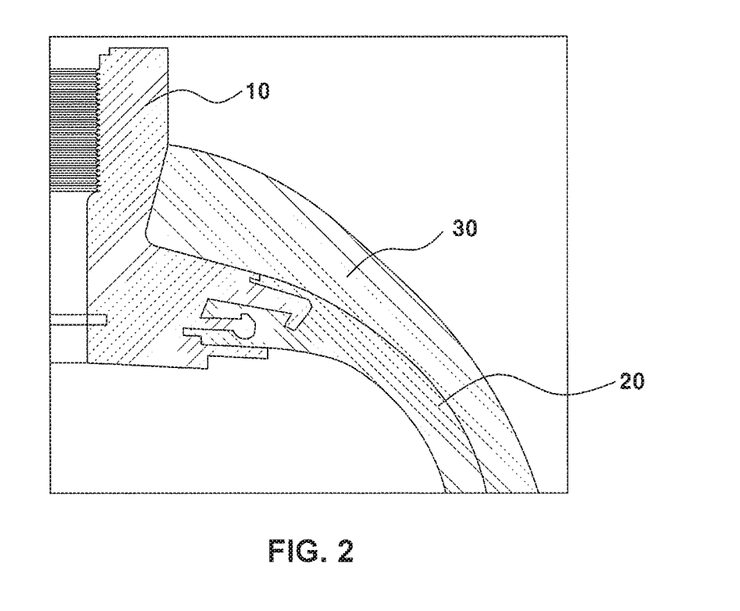

FIGS. 1 and 2 illustrate a general dome of a type-4 high pressure tank. The dome may have a boss 10 formed at a part thereof. The boss 10 may have a liner 20 coupled to one end thereof, and multiple layers of composite material 30 or specifically multiple layers of composite material 30 made of carbon fiber may be wound around an outer circumferential surface of the structure in which the boss 10 and the liner 20 are coupled to each other.

Figure 3A:
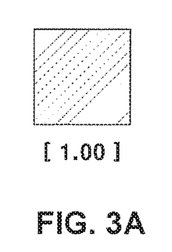
FIGS. 3A-3C are diagrams showing ratios of section moduli depending on cross-sectional shapes according to the related art.
Figure 3B:
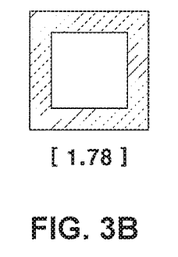
Figure 3C:
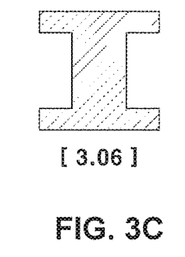

FIG. 3 shows ratios of section moduli for different cross-sectional shapes having the same area. Referring to FIG. 3, a rectangular cross-section having a square empty space has a larger section modulus than a rectangular cross-section having no empty space, and an I-shaped cross-section has a larger section modulus than the above-described two cross-sections. A stress equation related to section modulus is as follows:

'σ=M/Z, where σ: stress, M: moment, and Z: section factor

Considering the above stress equation, it is obvious to those skilled in the art that the stress is decreased as the section modulus is increased. Thus, when the section modulus is increased, the stress is decreased while the resistance to bending is increased. As a result, although the same external pressure is applied, the strength and durability of the corresponding member to the external pressure can be improved. Therefore, in the present exemplary embodiment, an empty space may be formed in the boss or a groove may be formed at the outer circumferential surface of the boss in order to increase the section modulus of the boss. Hereafter, the empty space will be referred to as 'hollow portion', and the groove will be referred to as 'semi-hollow portion'.

Figure 4:
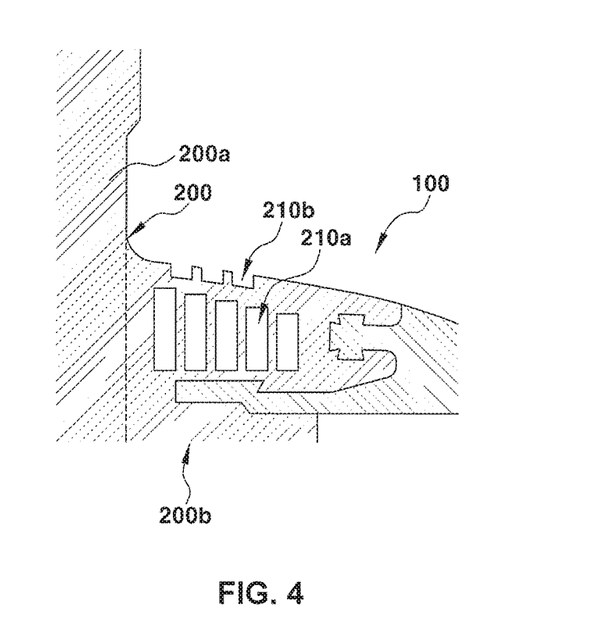
FIG. 4 is a diagram illustrating a high pressure tank according to an exemplary embodiment of the present disclosure, having hollow portions formed in a shoulder of a boss and semi-hollow portions formed at an outer circumferential surface of the shoulder.

FIG. 4 illustrates a structure of a reinforced boss according to an exemplary embodiment of the present disclosure. In an exemplary embodiment, a high pressure tank may include a liner and a dome 100 formed at either side of the liner. The dome 100 may have a boss 200 formed at one end thereof. In a certain embodiment, the boss 200 may be made of a metallic material.

The boss 200 may be divided into a head 200a and a shoulder 200b. The head 200a of the boss 200 may include a flow path or passage formed therein, which connects the inside and outside of the high-pressure tank, and a nozzle (not shown) may be attached to or detached from an end of the flow path or passage. The head 200a of the boss 200 may include a spiral groove for screw tightening. Further, the head 200a may have a shape in which liners having different diameters are arranged above and below, and the liners having different diameters may be connected to each other by a tapered liner. According to an exemplary embodiment of the present disclosure, one liner that is farther from the high pressure tank may have a larger diameter than another liner closer to the high pressure tank.

The shoulder 200b of the boss 200 may be radially extended from the head 200a at the bottom of the head 200a. Referring to the cross-sectional structure of FIG. 4, the shoulder 200b may be extended in a direction perpendicular to the circumferential direction of the head 200a or a direction which is the nearest perpendicular to the circumferential direction of the head 200a. The cross-section of the shoulder 200b may have a thickness increasing toward the head 200a and a width decreasing away from the head 200a.

According to an exemplary embodiment of the present disclosure, a carbon fiber composite material may be wound on both an outer circumferential surface of the boss 200 and a liner which are coupled to each other. The carbon fiber composite material may be repeatedly wound around the dome 100 until the carbon fiber composite material is stacked to the height at which the tapered liner of the head 200a meets the liner having the larger diameter between the liners having different diameters.

Referring back to FIG. 4, the hollow portion 210a may be formed in the shoulder 200b of the boss 200, and the semi-hollow portion 210b may be formed at the outer circumferential surface of the shoulder 200b. Here, one hollow portion 210a and one semi-hollow portion 210b may be formed, or a plurality of hollow portions 210a and semi-hollow portions 210b may be formed. In other words, one or more hollow portions 210a and one or more semi-hollow portions 210b may be formed in the shoulder 200b and/or at the outer circumferential surface of the shoulder 200b.

Figure 5A:
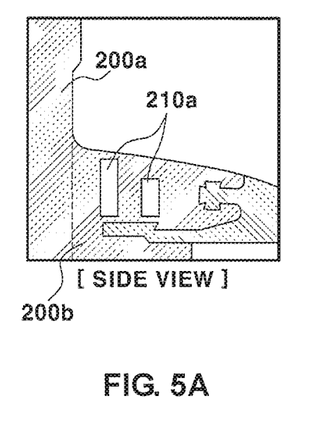
FIGS. 5A and 5B are diagrams illustrating a high pressure tank according to another exemplary embodiment of the present disclosure, including a cross-sectional view and perspective view of hollow portions in a shoulder formed in a ring shape.
Figure 5B:
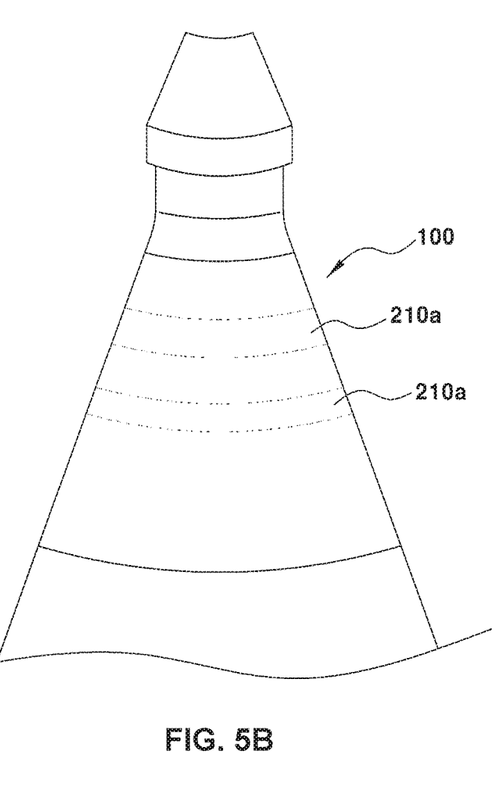

According to another exemplary embodiment of the present disclosure, the hollow portions 210a may have a ring shape in the shoulder 200b as illustrated in FIGS. 5A and 5B. Therefore, when the boss 200 is seen from the top, the hollow portions 210a may form concentric circles with a center point set to a center of the head 200a of the boss 200. The hollow portion 210a may have a cross-sectional width proportional to the width of the shoulder 200b. Thus, the cross-section of a hollow portion 210a may have a larger length and a larger area toward the head 200a. On the contrary, a hollow portion 210a may have a smaller length away from the head 200 and have a smaller area accordingly.

That is, the ring-shaped hollow portion 210a may be formed in an empty liner shape which has a predetermined width in a direction perpendicular to the ring-shaped circular cross-section. Further, when a plurality of hollow portions 210a is formed, liners formed by the hollow portions 210a may have different widths. Furthermore, even in one liner, hollow portions 210a may be formed in cylindrical shapes having different diameters along the direction perpendicular to the ring-shaped circular cross-section.

Figure 6A:
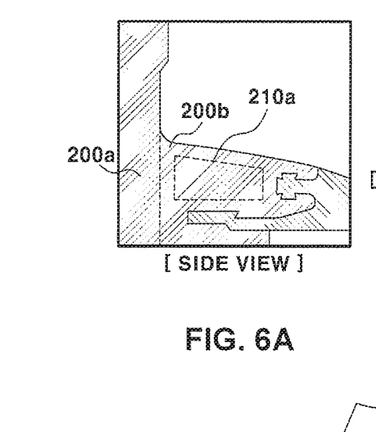
FIGS. 6A-6C are diagrams illustrating a high pressure tank according to another exemplary embodiment of the present disclosure, including a cross-sectional view and perspective view of hollow portions in a shoulder formed in a plate shape.
Figure 6B:
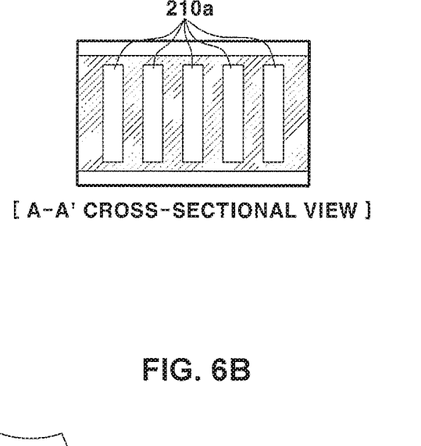
Figure 6C:
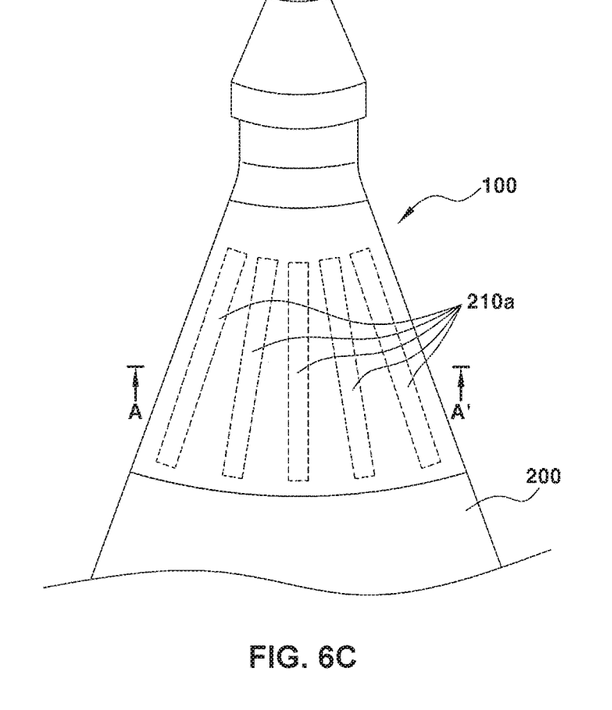

Referring to FIGS. 6A-6C illustrating another exemplary embodiment of the present disclosure, the hollow portions 210a may have a plate shape in the shoulder 200b. Thus, when the boss 200 is seen from the top, the hollow portions 210a may be arranged in a radial direction with the center point set to a center of the head 200a of the boss 200. That is, the plate-shaped hollow portion 210a may have a rectangular shape, based on the cross-sectional view of the boss 200. The cross-section of the hollow portion 210a may have a trapezoid shape similar to a rectangular shape. Specifically, the plate-shaped hollow portion 210a may be formed in a trapezoid shape where one side close to the head 200a has a larger length than the other side remote from the head 200a.

Figures 7A, 7B, 7C:
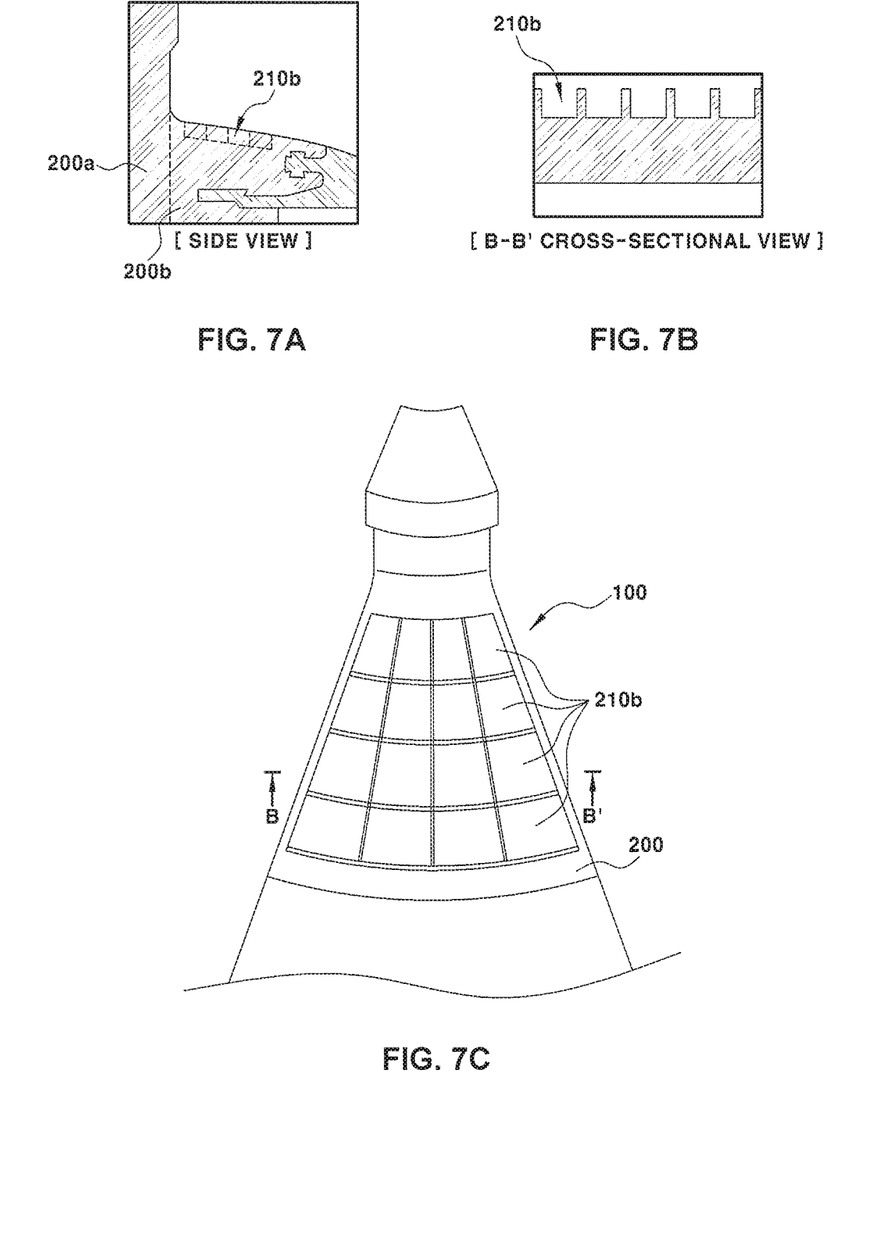
FIGS. 7A-7C are diagrams illustrating a high pressure tank according to still another exemplary embodiment of the present disclosure, including a cross-sectional view and perspective view of semi-hollow portions formed at an outer circumferential surface of a shoulder.

Referring to FIGS. 7A-7C illustrating still another exemplary embodiment of the present disclosure, semi-hollow portions 210b may be formed along the outer circumferential surface of the shoulder 200b. According to an exemplary embodiment of the present disclosure, the semi-hollow portions 210b formed along the outer circumferential surface of the shoulder 200b may have a ring shape on the outer circumferential surface of the shoulder 200b. Thus, when the boss 200 is seen from the top, the semi-hollow portions 210b may form concentric circles with a center point set to the center of the head 200a of the boss 200. According to an exemplary embodiment of the present disclosure, the semi-hollow portions 210b formed along the outer circumferential surface of the shoulder 200b may be arranged in a radial direction with the center point set to the center of the head 200a of the boss 200. Furthermore, according to an exemplary embodiment of the present disclosure, the semi-hollow portions 210b may be radially formed in a ring shape along the outer circumferential surface of the shoulder 200b. That is, the ring-shaped semi-hollow portions 210b and the radial semi-hollow portions 210b may cross each other to form a waffle pattern of semi-hollow portions 210b.

When a plurality of semi-hollow portions 210b are formed at the outer circumferential surface of the shoulder 200b regardless of the direction in which the semi-hollow portions 210b are formed, the semi-hollow portions 210b may have depths at which the bottom surfaces of the semi-hollow portions 201b are formed at a constant level. According to still another exemplary embodiment of the present disclosure, the plurality of semi-hollow portions 210b may have a constant depth such that bottom surfaces of the semi-hollow portions 210b are formed at different levels.

Turning back to FIG. 4, the hollow portion 210a and the semi-hollow portion 210b may be simultaneously formed in the shoulder 200b and at the outer circumferential surface of the shoulder 200b. A plurality of hollow portions 210a may be formed in the shoulder 200b, and a plurality of semi-hollow portions 210b may be formed at the outer circumferential surface of the shoulder 200b. Specifically, each of the semi-hollow portions 210b formed at the outer circumferential surface of the shoulder 200b may be located at an upper part of a wall between two hollow portions 210a adjacent to each other in the shoulder 200b. In other words, the shoulder 200b may have a cross-sectional shape similar to the alphabet "I" due to two adjacent hollow portions 210a in the shoulder 200b and the semi-hollow portions 210b formed at the outer circumferential surface of the shoulder 200b. Thus, the section modulus of the shoulder 200b can be increased.

In the exemplary embodiments of the present disclosure, the hollow portions 210a and/or the semi-hollow portions 210b may be arranged in parallel to each other at predetermined intervals. Moreover, the hollow portions 210a and/or the semi-hollow portions 210b may be arranged at irregular intervals. That is, although a distance between the hollow portions 210a or the semi-hollow portions 210b is not constant, the hollow portions 210a or the semi-hollow portions 210b may be arranged in such a manner that the distance is repeated according to a predetermined pattern.

The locations where the hollow portions 210a and the semi-hollow portions 210b are formed, the angle, and the direction where the hollow portions 210a and the semi-hollow portions 210b are arranged may be related to the direction where a composite material is wound around the outside of the shoulder 200b of the boss 200. The present disclosure is directed to improving the durability and strength to an external force, while reducing the weight of the boss 200. In this connection, when the composite material is wound around the structure in which the boss 200 and the liner are coupled to each other after the boss 200 and the liner are coupled to each other, the boss 200 inevitably receives force caused by the wound composite material. In this case, the direction of the force received by the boss 200 is inevitably related to the direction in which the composite material is wound. Therefore, in the present embodiment, the design related to the locations and orientation angle of the hollow portions 210a and the semi-hollow portions 210b may consider the winding angle and direction as variables.

That is, the hollow portions formed in the shoulder arranged around the boss or specifically the head of the boss and/or the semi-hollow portions formed at the outer circumferential surface of the shoulder can increase the section modulus of the cross-section of the boss shoulder, thereby reducing stress. Therefore, according to the present disclosure, the hollow portions are formed in the shoulder and the semi-hollow portions are formed at the outer circumferential surface of the shoulder.

The present disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

Detailed descriptions related to publicly-known functions or configurations will be ruled out in order not to unnecessarily obscure subject matters of the present disclosure. The terms used herein are defined in consideration of their functions in the exemplary embodiments of the present disclosure, and may differ depending on the custom or intention of a user or operator. Therefore, the definitions should be based on the overall contents of this specification. Thus, the present disclosure is not limited to the exemplary embodiments disclosed in the detailed descriptions, but attached claims may include other exemplary embodiments.

What is claimed is:

1. A high pressure tank having a reinforced boss, the high pressure tank comprising:
   a liner;
   a dome disposed at each end of the liner; and
   a boss disposed at one end of the dome,
   wherein the boss comprises:
      a head having a flow path through which fuel flows into and out of the high pressure tank; and
      a shoulder extending in a radial direction from the head and surrounding the head,
   wherein the shoulder has one or more hollow portions defined therein,
   wherein the one or more hollow portions are an empty space, and
   wherein the one or more hollow portions does not contact the liner.

2. The high pressure tank of claim 1, wherein each of the one or more hollow portions has a ring shape in the shoulder while having a concentric circular shape from the head of the boss, and
   wherein a width of each of the one or more hollow portions increases toward the head.

3. The high pressure tank of claim 1, wherein each of the one or more hollow portions has a plate shape in the shoulder and arranged in a radial direction from a center of the head.

4. The high pressure tank of claim 1, wherein the one or more hollow portions are arranged at a constant interval.

5. The high pressure tank of claim 1, wherein a composite material is wound around the shoulder of the boss.

6. The high pressure tank of claim 1, wherein the head comprises:
   a plurality of liners having different diameters; and
   a tapered inclined surface connecting the plurality of liners from each other, wherein a composite material is wound around the head to a level at which the tapered inclined surface meets a liner that has the largest diameter among the plurality of liners.

7. A high pressure tank having a reinforced boss, the high pressure tank comprising:
   a liner;
   a dome disposed at either end of the liner; and
   a boss disposed at one end of the dome,
   wherein the boss comprises:
      a head comprising a flow path through which fuel is introduced into and out of the high pressure tank; and
      a shoulder extending in a radial direction from the head and surrounding the head,
   wherein the shoulder has one or more semi-hollow portions defined at an outer circumferential surface of the shoulder,
   wherein the one or more semi-hollow portions are an empty space, and
   wherein the one or more semi-hollow portions does not contact the liner.

8. The high pressure tank of claim 7, wherein the one or more semi-hollow portions are defined at the outer circumferential surface of the shoulder while being arranged in a radial direction from a center of the head.

9. The high pressure tank of claim 7, wherein the one or more semi-hollow portions are arranged in a waffle pattern at the outer circumferential surface of the shoulder.

10. The high pressure tank of claim 7, wherein the one or more semi-hollow portions are arranged at a constant interval.

11. The high pressure tank of claim 7, wherein a composite material is wound around the shoulder of the boss.

12. The high pressure tank of claim 7, wherein the head comprises:
    a plurality of liners having different diameters; and
    a tapered inclined surface connecting the plurality of liners, wherein a composite material is wound around the head to a level at which the tapered inclined surface meets a liner having the largest diameter among the plurality of liners.

13. A high pressure tank having a reinforced boss, the high pressure tank comprising:
    a liner;
    a dome disposed at each end of the liner; and
    a boss disposed at one end of the dome, the boss comprises:
       a head comprising a flow path through which fuel is introduced into and out of the high pressure tank; and
       a shoulder extending in a radial direction from the head, and surrounding the head, and
    wherein the shoulder has one or more hollow portions defined therein and one or more semi-hollow portions defined at an outer circumferential surface of the shoulder,
    wherein the one or more hollow portions and the one or more semi-hollow portions are an empty space, and
    wherein the one or more hollow portions and the one or more semi-hollow portions do not contact the liner.

14. The high pressure tank of claim 13, wherein each of the one or more semi-hollow portions defined at the circumferential surface of the shoulder is located at an upper portion of a wall between two adjacent one or more hollow portions among the one or more hollow portions defined in the shoulder.

15. The high pressure tank of claim 13, wherein the one or more hollow portions and the one or more semi-hollow portions are arranged at a constant interval.

16. The high pressure tank of claim 13, wherein a composite material is wound around the shoulder of the boss.

17. The high pressure tank of claim 13, wherein the head comprises:
    a plurality of liners having different diameters; and
    a tapered inclined surface connecting the plurality of liners, wherein a composite material is wound around the head to a level at which the tapered inclined surface meets a liner having the largest diameter among the plurality of liners having different diameters.

* * * * *